Feb. 22, 1966  A. S. KROTZ  3,235,941
METHOD OF MAKING TUBULAR JOINTS
Original Filed Oct. 17, 1962

INVENTOR.
Alvin S Krotz
BY Ralph Hammar
Attorney

United States Patent Office 3,235,941
Patented Feb. 22, 1966

3,235,941
METHOD OF MAKING TUBULAR JOINTS
Alvin S. Krotz, Erie, Pa., assignor to Lord Manufacturing Company, Erie, Pa., a corporation of Pennsylvania
Continuation of application Ser. No. 231,156, Oct. 17, 1962. This application Oct. 30, 1964, Ser. No. 409,348
5 Claims. (Cl. 29—149.5)

This application is a continuation of application Serial No. 231,156, now abandoned.

This invention is a method of making a tubular or annular mounting, bearing or joint which is extremely stiff in radial directions as compared to the stiffness in axial or torsional directions.

The utility of mountings or joints (also known as bearings, couplings, bushings, springs) to accommodate relative motion is well known in the prior art. See Patents 1,452,693, 1,548,048, Re. 18,457, 1,914,348, 2,044,392, 2,044,393, 2,044,976, 2,175,825, 2,175,999, 2,294,674, 2,327,113, 2,414,743, 3,071,422, 3,140,081.

The need for a differential between the stiffness in radial as compared to axial or torsional directions is disclosed generally in Patents 2,175,825 and 2,175,999. The method of this invention increases the radial stiffness without increasing the stiffness in torsional directions. In a preferred method this is obtained by a plurality of thin elastomeric layers or plies sandwiched between and bonded to metal layers wound in spiral fashion and interrupted at angularly spaced intervals.

Figure 1:
Figure 2:
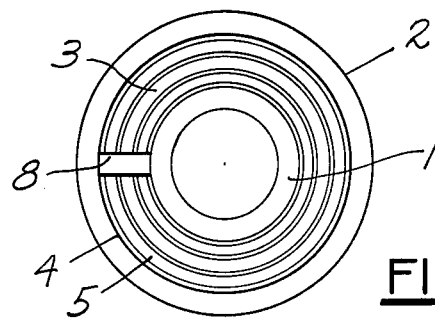
Figure 3:
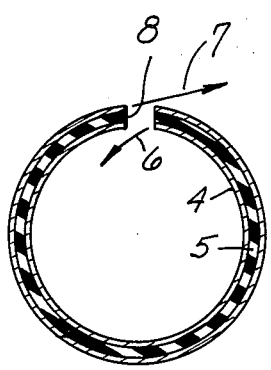
Figure 4:
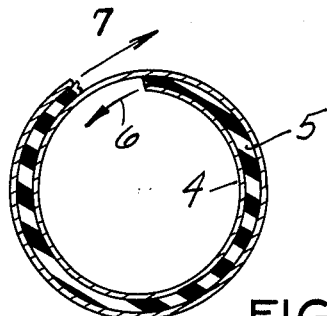
Figure 5:
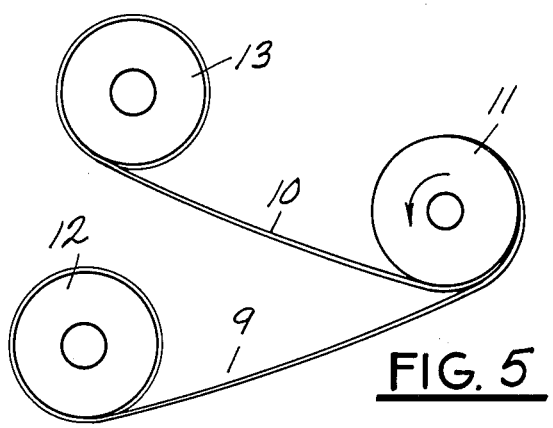
Figure 7:
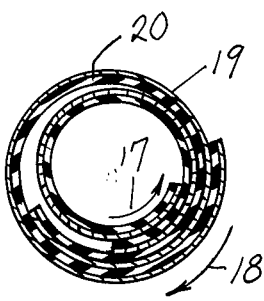
Figure 6:
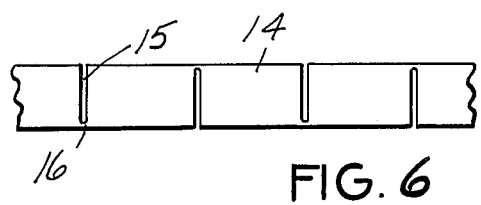

In the drawing, FIG. 1 is a side view of a mounting, bearing or joint, FIG. 2 is an end view of the mounting, bearing or joint of FIG. 1, FIGS. 3 and 4 are diagrammatic views illustrating the operation in torsional directions, and FIGS. 5, 6 and 7 show methods of making the joint.

The joint illustrated in FIGS. 1 and 2 comprises supporting and supported members 1 and 2 and a tubular or annular flexing section 3. The flexing section comprises alternate layers 4 and 5 of metal and elastomer in superposed relation and bonded together. The innermost layer of the flexing section may be bonded to the outer cylindrical surface of the member 1 and the outermost layer of the flexing section 3 may be bonded to the inner cylindrical surface of the member 2. Techniques for bonding elastomer and metal are well known in the art. Bonding may take place during vulcanization or curing of the elastomer. Other arrangements for securing the flexing section to the members 1 and 2 may be used such as adhesives. For convenience of illustration, the layers 4 and 5 are shown as concentric in FIG. 2 although actually the layers have an almost imperceptable spiral.

If the individual layers 4 and 5 were wound in a connected or uninterrupted spiral as indicated diagrammatically in FIG. 4, where only two metal layers 4 and one elastomer layer 5 are shown, forces in a torsional direction, indicated by arrows 6 and 7, would tend to cause radial movement between the metal layers 4, subjecting the intervening layer 5 of elastomer to tension and compression. This would materially stiffen the joint in the torsional direction. This stiffening effect is eliminated by an axially and radially extending slot 8 interrupting the metal and elastomer layers. As diagrammatically shown in FIG. 3, where only two metal layers 4 and one elastomer layer 5 are shown, torsional forces indicated by arrows 6 and 7 now cause shearing of the intervening elastomer and since the elastomer is much softer in shear than in tension or compression, the torsional stiffness of the joint is greatly reduced as compared to FIG. 4. In the particular mounting illustrated where there are a large number of thin layers of metal and elastomer in superposed relation, the reduction in torsional stiffness of the joint is even more pronounced because the multiplicity of thin layers of metal and elastomer greatly increase the stiffness of the elastomer in tension and compression.

The stiffening effect of the intermediate layers of metal bonded into the elastomer is well understood. A cube of elastomer unconfined may have, for example, a stiffness in shear or parallel to its ends approximately one third the stiffness in tension or compression or normal to its ends. If the unconfined surfaces of the elastomer between the ends of the elastomer are broken up by bonding into the elastomer, a plurality of plates spaced from each other and parallel to the ends of the cube, the stiffness of the elastomer in shear will remain essentially constant while the stiffness in tension and compression will increase as the number of plates increases (and, consequently, the spacing between adjacent plates decreases).

Because the flexing section 3 of the joint is made by winding techniques, it is possible to wind very thin layers of metal and elastomer and thereby produce a tremendous differential between the stiffness in radial directions where the elastomer is stressed in tension and compression and the stiffness in torsional and axial directions where the elastomer is stressed in shear. If it were not for the interruption of the convolutions, the radial movement accompanying torsion would greatly stiffen the joint in the torsional direction.

The winding technique also greatly simplifies the manufacture of the mounting. The assembly of a large number of concentric sleeves of metal and elastomer would be difficult, if not impossible. In the particular mounting from which the drawings were made, the thickness of the metal 4 is .020" and the thickness of the rubber 5 is .040". Even thinner sections of metal and elastomer may be used if still greater stiffness in the radial or compression direction is desired.

FIG. 5 illustrates one method of making the flexing section. As there shown, a sheet 9 of calendered elastomer and a sheet 10 of metal are convolutely wound on a mandrel 11. When the desired number of spiral convolutions have been built up on the mandrel, the winding operation is stopped and the metal and rubber convolutions bonded together. Before, or after, the bonding, the slot 8 is cut to interrupt the convolutions at angularly spaced intervals and permit the independent action illustrated in FIG. 3. When the slot 8 is cut before bonding or curing of the elastomer, the slot may be filled with elastomer prior to curing. The members 1 and 2 may be bonded or otherwise secured to the flexing section either after or during the bonding of the individual layers of the flexing section to each other. The rubber and elastomer layers 9 and 10 are shown as separate layers coming from separate reels 12 and 13 but the layers 9 and 10 could be a single multi-ply strip. More than two plies can be used. Preferably, with more than two plies, one of the outermost plies is an elastomer which bonds the metal pieces together. Another technique which can be used is to coat the metal strip with elastomer. The bonding of the layers of elastomer to the layers of metal may take place before or after winding the spiral convolutions and before or after vulcanizing or curing of the elastomer. The uniting of spiral convolutions to each other may be by adhesive or by elastomer to metal bonding.

In FIG. 6, the metal strip 14 is provided with slots 15 extending almost the full width of the strip. The strip 14 is used in the same manner as the strip 10 of FIG. 5. Under load, the weakened sections 16 provided by the slots 15 break and provide interruptions of the convolutions at angularly spaced intervals. These interruptions do not line up and provide the same appearance as the slot 8 but the effect is the same in that the interrupted sections of the metal shear in torsion relative to each other without causing the radial stress present in an uninterrupted spiral.

The same effect, with less convenience, can be obtained by winding successive convolutions in opposite directions as shown in FIG. 7 so as to prevent wind up under torsional stress. As there shown, an inner convolution of somewhat more than one turn is wound in the direction of arrow 17 and is followed by a succeeding convolution of somewhat more than one turn wound in the direction of arrow 18. As there illustrated, each of the convolutions consists of a multi-ply layer of metal 19 and elastomer 20.

Joints are staple articles or commodities of commerce used to accommodate or permit relative motion between relatively movable parts. Typically, joints are specified by the load to be carried, by the motion to be accommodated, and by the stiffness. One use is in hinges where, for example, the member 1 may be fixed to the hinge pin and the member 2 may be fixed to the hinge knuckle. Relative angular motion between the hinge pin and knuckle is accommodated by shear of the elastomer between the members 1 and 2 while the stiffness of the elastomer in radial directions holds the members 1 and 2 concentric under radial loads. Other uses of the joint are as resilient mountings, as couplings and as pivot bearings.

What is claimed as new is:

1. The method of making a joint having an outer pivot member having a cylindrical inner surface, an inner pivot member having a cylindrical outer surface radially spaced from and presented to said inner surface and an annular flexing section between said surfaces which is stiff in radial directions as compared to the stiffness in axial or torsional directions which comprises convolutely winding an annulus of a plurality of superposed thin spiral convolutions, each convolution comprising at least a layer of metal and a layer of elastomer, interrupting the metal at angularly spaced intervals to permit independent torsional movement between the uninterrupted sections of the metal layers, bonding together the convolutions, and securing the outer surface of said annulus to said cylindrical inner surface and the inner surface of said annulus to said cylindrical outer surface.

2. The method of claim 1 in which the layers of metal are interrupted by cutting a slot radially and axially through the metal and elastomer layers.

3. The method of claim 1 in which successive convolutions are of more than one turn and disconnected from each other and wound in opposite directions.

4. The method of claim 1 in which each convolution comprises a multi-ply layer of metal and elastomer.

5. The method of making a joint having an outer pivot member having a cylindrical inner surface, an inner pivot member having a cylindrical outer surface radially spaced from and presented to said inner surface and an annular flexing section between said surfaces which is stiff in radial directions as compared to the stiffness in axial or torsional directions which comprises convolutely winding an annulus of a plurality of superposed thin spiral convolutions, each convolution comprising at least a layer of metal and a layer of elastomer, the metal layers being weakened at successive intervals along the length so as to permit independent torsional movement between the metal layers, bonding together the convolutions, and securing the outer surface of said annulus to said cylindrical inner surface and the inner surface of said annulus to said cylindrical outer surface.

References Cited by the Examiner

UNITED STATES PATENTS

| | | | |
|---|---|---|---|
| 2,001,257 | 5/1935 | Lecler | 287—85 |
| 2,126,704 | 8/1938 | Schmidt | 287—85 |
| 2,233,110 | 2/1941 | Piron | 267—63 |
| 2,366,168 | 1/1945 | Bakarian | 29—475 |
| 2,692,098 | 10/1954 | Schmued et al. | 267—57.1 XR |
| 2,900,713 | 8/1959 | Young | 29—475 |
| 2,907,967 | 10/1959 | Smith | 29—155.57 |
| 2,927,366 | 3/1960 | Link | 29—155.57 |

WHITMORE A. WILTZ, *Primary Examiner.*

CARL W. TOMLIN, THOMAS H. EAGER, *Examiners.*